US006456755B1

(12) United States Patent
Sonoda

(10) Patent No.: US 6,456,755 B1
(45) Date of Patent: Sep. 24, 2002

(54) OPTICAL WAVELENGTH DIVISION MULTIPLEX SYSTEM AND METHOD THEREOF

(75) Inventor: Yukio Sonoda, Miyagi (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/505,778

(22) Filed: Feb. 17, 2000

(30) Foreign Application Priority Data

Feb. 17, 1999 (JP) .......................................... 11-038742

(51) Int. Cl.[7] ................................................ G02B 6/28
(52) U.S. Cl. ......................... 385/24; 359/124; 359/127; 359/161; 359/173
(58) Field of Search ................................. 359/124, 127, 359/161, 164, 173; 385/24, 27

(56) References Cited

U.S. PATENT DOCUMENTS 5,956,440 A * 9/1999 Mikami et al. ................ 385/24
6,137,604 A * 11/2000 Bergano ...................... 359/124

FOREIGN PATENT DOCUMENTS

| EP | 1061675 A2 * | 12/2000 | ........... H04B/10/18 |
| JP | 7-107069 | 4/1995 | |
| JP | 9-116493 | 5/1997 | |
| JP | 9-326759 | 12/1997 | |
| JP | 10-145298 | 5/1998 | |
| JP | 11-55181 | 2/1999 | |
| JP | 11-103286 | 4/1999 | |

OTHER PUBLICATIONS

Japanese Office Action dated Oct. 10, 2000, with partial translation.

* cited by examiner

Primary Examiner—Hemang Sanghavi
Assistant Examiner—Omar Rojas
(74) Attorney, Agent, or Firm—McGinn & Gibb, PLLC

(57) ABSTRACT

An optical wavelength division multiplex (WDM) system and an optical WDM method, in which a trouble in one optical wavelength divider does not influence the other optical wavelength multiplexed signals to be divided, are provided. An inputted optical wavelength multiplexed signal branches into "n" optical wavelength mutilplexed signals at a first optical coupler. After cutoff shifted or dispersion compensation operation is performed for the branching optical wavelength multiplexed signals, the performed optical wavelength multiplexed signals are inputted to second and third optical couplers respectively. The "n" optical wavelength multiplexed signals inputted to the second and third optical couplers are outputted to "n" optical coupler dividers via cutoff shifted or dispersion compensation fibers (CSF/DCFs) or directly from the second and third optical couplers. At each of the "n" optical wavelength dividers, a required optical wavelength signal is extracted and the extracted optical wavelength signal is outputted respectively. By connecting the optical coupler to the optical wavelength dividers, and making one optical wavelength multiplexed signal and one optical wavelength divider a pair respectively, the optical wavelength dividing processes between one optical wavelength signal outputted from one optical wavelength divider and the other optical wavelength signals outputted from the other optical wavelength dividers become independent with each other. As a result, even when a trouble occurs at one optical wavelength divider in which one optical wavelength is extracted, the one optical wavelength is suffered by the trouble and causes abnormal communication, and the deterioration of the communication quality for the other optical wavelength signals can be prevented.

8 Claims, 2 Drawing Sheets

OPTICAL WAVELENGTH DIVISION MULTIPLEX SYSTEM AND METHOD THEREOF

BACKGROUND OF THE INVENTION

The present invention relates to an optical wavelength division multiplex (WDM) system and a method thereof, which are applied to an optical multiplex communication.

DESCRIPTION OF THE RELATED ART

A conventional optical WDM system generally has a structure, in which cutoff shifted fibers or dispersion compensation fibers (CSF/DCFs), optical amplifiers and optical wavelength dividers are connected in series, and an optical wavelength division is performed.

FIG. 1 is a block diagram showing a conventional structure of an optical WDM system. As shown in FIG. 1, this conventional optical WDM system consists of a structure, in which eight CSF/DCFs 11 to 18, three optical amplifiers 21 to 23 and eight optical wavelength dividers 31 to 38 are connected in series. In this conventional example, as input signals, eight optical wavelengths $\lambda 1$ to $\lambda 8$ are used.

An optical wavelength multiplexed signal is inputted to the first CSF/DCF 11 of this conventional WDM system. At the CSF/DCFs 11 to 18, either cutoff shifted or dispersion compensation operation is performed for the inputted optical wavelength multiplexed signal. And the performed signal at the first CSF/DCF 11 is outputted to the optical amplifiers 21 and the amplified signal is outputted to the first optical wavelength divider 31. And this operation is performed in sequence.

At the optical wavelength dividers 31 to 38, only a designated optical wavelength is extracted. The remaining optical wavelength multiplexed signal not transmitted through the optical wavelength dividers is inputted to the next CSF/DCF. This operation is continued until all designated optical wavelengths are extracted at the designated optical wavelength dividers.

Japanese Patent Application Laid-Open No. HEI 9-116493 discloses an optical WDM system, in which one optical coupler performs the division of three optical wavelengths. And Japanese Patent Application Laid-Open No. HEI 9-326759 discloses an optical wavelength dividing apparatus for optical WDM system, in which dispersion compensation and loss compensation are performed efficiently. And Japanese Patent Application Laid-Open No. HEI 10-145298 discloses an optical wavelength dividing apparatus for optical WDM system, in which dispersion compensation and loss compensation are performed efficiently and the number of active devices is reduced.

However, at the conventional examples mentioned above, when a trouble occurs at one optical wavelength divider in the optical WDM system, the trouble also influences the other optical wavelength multiplexed signals transmitted through the optical WDM divider. As a result, abnormal communication occurs at a designated optical wavelength and even at optical wavelengths except the designated wavelength, and the quality of the communication is deteriorated. Moreover, there is a problem that only either one of cutoff shifted or dispersion compensation operation is performed due to the structure.

SUMMARY OF THE INVENTION

It is therefore an object of the present invention to provide an optical wavelength division multiplex (WDM) system and a method thereof, in which a trouble of an optical wavelength divider in the system does not influence the other optical wavelengths except a designated optical wavelength that is operated at the optical wavelength divider where the trouble occurred.

According to a first aspect of the present invention, for achieving the object mentioned above, an optical wavelength division multiplex (WDM) system provides an optical coupler in which inputted one optical wavelength multiplexed signal branches into "n" optical wavelength multiplexed signals, in this "n" is an integer being two or more, and "n" optical wavelength dividers, to which said branching "n" optical wavelength multiplexed signals are inputted, and in which each of said "n" optical wavelength dividers extracts a required optical wavelength signal from said branching optical wavelength multiplexed signals respectively, and which output the extracted optical wavelength signals. And the WDM system connects said optical coupler to said "n" optical wavelength dividers, and makes each one of said branching "n" optical wavelength multiplexed signals and each one of said "n" optical wavelength dividers a pair respectively, and makes optical wavelength multiplexed signal dividing operation between said one optical wavelength signal to be outputted from said one optical wavelength divider and said the other optical wavelength signals to be outputted from said other optical wavelength dividers independent mutually.

According to a second aspect of the present invention, in the first aspect, an optical WDM system further provides an optical amplifier which amplifies said inputted optical wavelength multiplexed signal, and cutoff shifted fibers (CSFs) which perform cutoff shifted operation or dispersion compensation fibers (DCFs) which perform dispersion compensation operation.

According to a third aspect of the present invention, in the first aspect, said one optical coupler connects to a plurality of optical wavelength dividers in parallel.

According to a fourth aspect of the present invention, an optical WDM system provides an optical amplifier which amplifies an inputted optical wavelength multiplexed signal and outputs the amplified optical wavelength multiplexed signal, a first optical coupler which is connected to said optical amplifier and to which said amplified optical multiplexed signal outputted from said optical amplifier is inputted, and in which said amplified inputted optical wavelength multiplexed signal branches into "n" optical wavelength multiplexed signals, in this "n" is an integer being two or more, a first cutoff shifted fiber or dispersion compensation fiber (CSF/DCF) and a second CSF/DCF which are connected in parallel to said first optical coupler, and to which said branching "n" optical wavelength multiplexed signals are inputted by the requirement of the cutoff shifted operation or dispersion compensation operation respectively, and perform the cutoff shifted or dispersion compensation operation for said branching "n" optical wavelength multiplexed signals, a second optical coupler which is connected to said first CSF/DCF, in which said branching optical wavelength multiplexed signals inputted from said first CSF/DCF branch into said required number of optical wavelength multiplexed signals, a third optical coupler which is connected to said second CSF/DCF, in which said branching optical wavelength multiplexed signals inputted from said second CSF/DCF branch into said required number of optical wavelength multiplexed signals, the number of optical wavelength multiplexed signals inputted to said second optical coupler-1 CSF/DCFs which are connected in parallel to said second optical coupler, the number of optical wavelength multiplexed signals inputted to said third optical coupler-1 CSF/DCFs which is connected in parallel to said third optical coupler, and "n" optical wavelength dividers which are connected in parallel to said number of optical wavelength multiplexed signals inputted to said second optical coupler-1 CSF/DCFs and to said number of optical wavelength multiplexed signals inputted to said third optical coupler-1 CSF/DCFs and to directly said second optical coupler and said third optical coupler respectively.

According to a fifth aspect of the present invention, an optical WDM method provides the steps of branching into "n" optical wavelength multiplexed signals for inputted one optical wavelength multiplexed signal, in this, "n" is an integer being two or more, dividing said optical wavelength multiplexed signal into "n" respective required optical wavelengths, by inputting said branching "n" optical wavelength multiplexed signals and extracting each required optical wavelength signal from said optical wavelength multiplexed signals and outputting the "n" extracted optical wavelength signals respectively, connecting said branching process to said dividing process, and making each one of said branching "n" optical wavelength multiplexed signals and each one of said "n" optical wavelength dividing processes a pair respectively, making optical wavelength multiplexed signal dividing process between said one optical wavelength signal to be outputted from said one optical wavelength dividing process and said the other optical wavelength signals to be outputted from said other optical wavelength processes independent mutually.

According to a sixth aspect of the present invention, in the fifth aspect, an optical WDM method further provides the steps of amplifying said inputted optical wavelength multiplexed signal, and cutoff shifted processing or dispersion compensation processing for said branching "n" optical wavelength multiplexed signals.

According to a seventh aspect of the present invention, in the fifth aspect, dividing said optical wavelength multiplexed signal into "n" respective required optical wavelengths is a process composed of a cascade connecting, and this cascade connecting includes a distributing parallel connecting.

According to a present invention, an optical WDM method provides the steps of amplifying an inputted optical wavelength multiplexed signal and outputting the amplified optical wavelength multiplexed signal, branching into "n" optical wavelength multiplexed signals for said amplified optical wavelength multiplexed signal outputted from said optical amplifying process and outputting said branching "n" optical wavelength multiplexed signals, in this, "n" is an integer being two or more, performing cutoff shifted operation or dispersion compensation operation for said branching "n" optical wavelength multiplexed signals by the requirement of the cutoff shifted operation or dispersion compensation operation respectively, and outputting optical wavelength multiplexed signals operated cutoff shifted or dispersion compensation to respective branching processes, branching into required number of optical wavelength multiplexed signals for optical wavelength multiplexed signals inputted from said cutoff shifted or dispersion compensation processes and outputting optical wavelength multiplexed signals, dividing "n" optical wavelength multiplexed signals into individual optical wavelength signal and outputting them, in which "n−2" of them are outputted from performing cutoff shifted operation or dispersion compensation operation and two of them are outputted from said branching processes directly.

BRIEF DESCRIPTION OF THE DRAWINGS

The objects and features of the present invention will become more apparent from the consideration of the following detailed description taken in, conjunction with the accompanying drawings in which.

DESCRIPTION OF THE PREFERRED EMBODIMENTS

Figure 1:
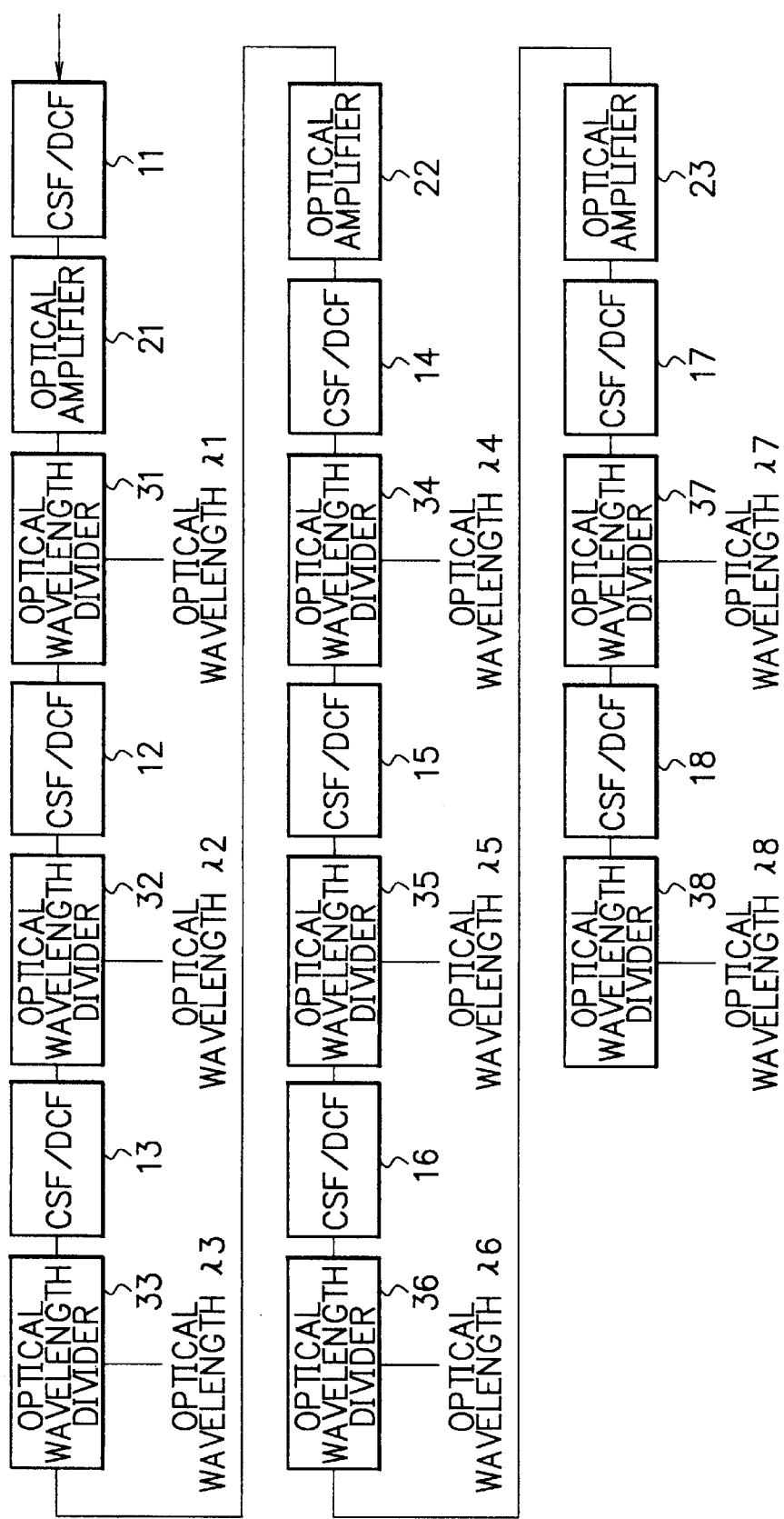
FIG. 1 is a block diagram showing a conventional structure of an optical WDM system.
Figure 2:
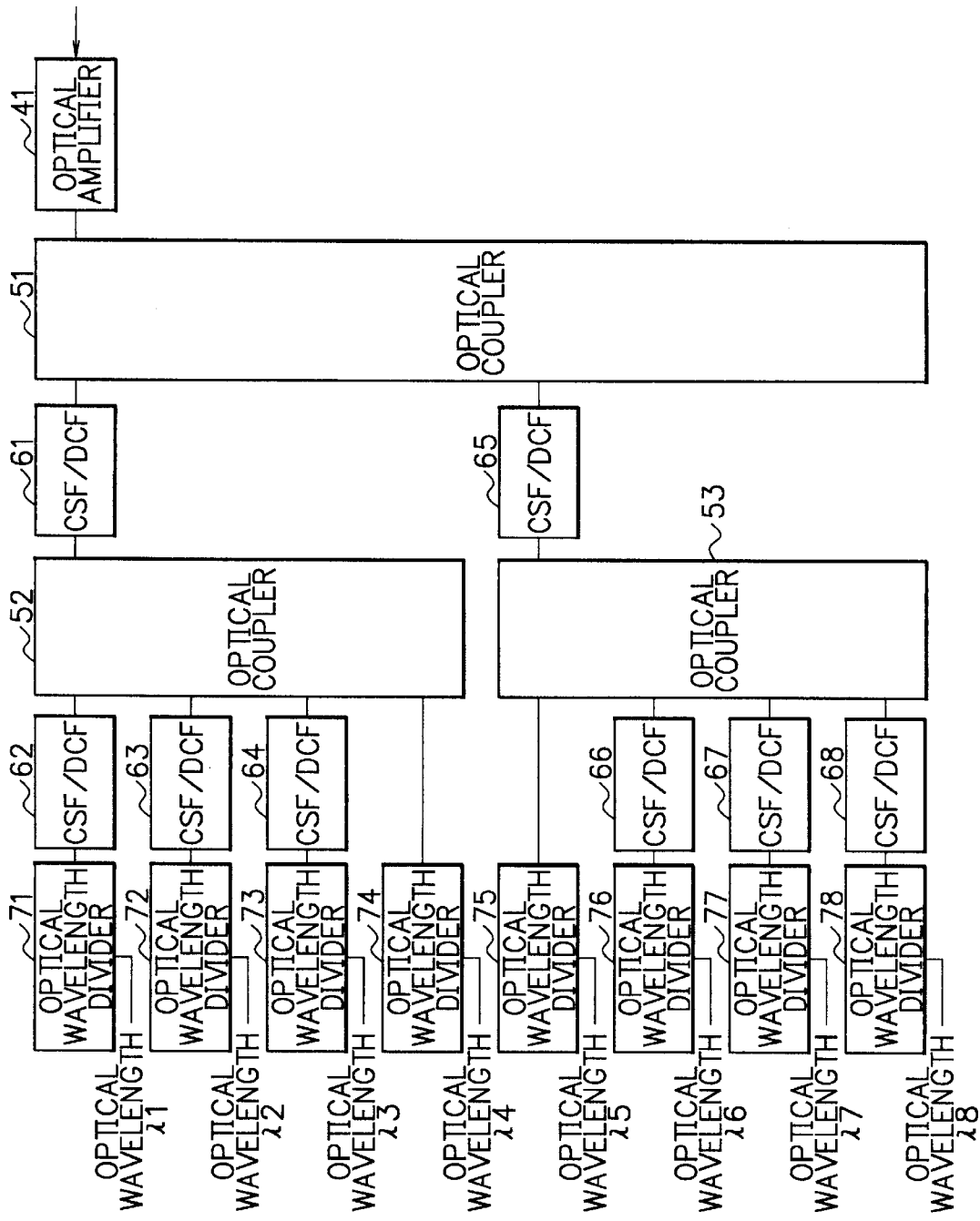
FIG. 2 is a block diagram showing a structure of an embodiment of an optical WDM system of the present invention.

Referring now to the drawing, an embodiment of the present invention is explained in detail. FIG. 2 is a block diagram showing a structure of the embodiment of an optical WDM system of the present invention. In this embodiment, as an example, eight optical wavelengths are applied, but the number of the optical wavelengths is not limited to eight, and nine or more wavelengths are applicable.

The optical WDM system of the present invention consists of one optical amplifier 41, three optical couplers 51 to 53, eight cutoff shifted fiber or dispersion compensation fiber (CSF/DCF)s 61 to 68 and eight optical wavelength dividers 71 to 78.

The optical amplifier 41 amplifies an inputted optical wavelength multiplexed signal in order to compensate a loss of the optical wavelength multiplexed signal at a transmission line and a loss of the optical signal at the optical wavelength dividing operation.

The optical wavelength multiplexed signal branches into multi signals at the optical couplers 51 to 53. The CSF/DCFs 61 to 68 perform cutoff shifted or dispersion compensation operation for the inputted optical wavelength multiplexed signal. Each of the optical wavelength dividers 71 to 78 extracts a designated optical wavelength from the branching optical wavelength multiplexed signals respectively.

Next the operation of the embodiment of the optical WDM system of the present invention is explained. First, an optical wavelength multiplexed signal is inputted to the optical amplifier 41. The optical amplifier 41 amplifies the inputted optical wavelength multiplexed signal in order to compensate a loss of the optical wavelength multiplexed signal at the transmission line and a loss of the optical signal at the optical wavelength dividing operation. After this, the optical amplifier 41 outputs the amplified optical wavelength multiplexed signal to the optical coupler 51.

At the optical coupler 51, the amplified optical wavelength multiplexed signal branches into an optical signal for cutoff shifted operation and an optical signal for dispersion compensation operation in order to be performed the cutoff shifted operation and the dispersion compensation operation. The branching respective optical wavelength multiplexed signals are inputted to the CSF/DCF 61 and the CSF/DCF 65.

In this explanation, cutoff shifted operation is performed at the CSF/DCF 61 and dispersion compensation operation is performed at the CSF/DCF 65. And, in order to make the explanation concise, the optical wavelength dividing operation for optical wavelengths $\lambda 1$ to $\lambda 4$, to which the cutoff shifted operation is performed at the CSF/DCF 61, is explained. In this, four optical wavelengths $\lambda 1$ to $\lambda 4$ are inputted to the CSF/DCF 61 for the cutoff shifted operation, however the number of wavelengths inputting to the cutoff shifted operation depends on the requirement of the operation and is not limited to four.

At the CSF/DCF 61, the cutoff shifted operation is performed to the optical wavelength multiplexed signal. In order to perform this operation efficiently, this cutoff shifted operation is performed by obtaining the greatest common divisor of each cutoff shifted amount of the optical wavelengths λ1 to λ4. And the result is inputted to the optical coupler 52.

At the optical coupler 52, the optical wavelength multiplexed signal performed the cutoff shifted operation branches into multi signals and the multi signals are inputted to the optical wavelength divider 74 and the CSF/DCFs 62 to 64.

The cutoff shifted operation used the greatest common divisor has been already performed at the CSF/DCF 61 for the optical wavelength multiplexed signal. Therefore, at the CSF/DCFs 62 to 64, the cutoff shifted operation is performed individually for the optical wavelength multiplexed signal and the result is outputted to the optical wavelength dividers 71 to 73.

Only a designated optical wavelength is extracted from the optical wavelength multiplexed signal at the optical wavelength dividers 71 to 74. In the explanation mentioned above, the cutoff shifted operation is explained. The optical wavelength dividing operation for optical wavelengths λ5 to λ8, to which the dispersion compensation operation is applied, is the same operation as mentioned above, but that the dispersion compensation operation is applied is different from the operation mentioned above, therefore the same explanation is omitted.

As mentioned above, according to the embodiment of the present invention, the optical wavelength multiplexed signal branches into multi signals at the optical coupler and the optical wavelength dividing operation is performed for each of the multi signals. Therefore, even at the case that a trouble occurs at any one of the optical wavelength dividers, an abnormal communication occurs at only the optical wavelength divider in which the trouble occurs. And the bad influence to the communication quality for other optical wavelengths having no trouble can be prevented.

And according to the embodiment of the present invention, the optical wavelength multiplexed signal branches into multi signals at the optical coupler. Therefore, the cutoff shifted operation and the dispersion compensation operation can be easily performed. And the present invention is an optical wavelength dividing system used optical couplers and can reduce a loss of the optical signal at the optical wavelength dividing operation in the optical communication. Moreover, the cutoff shifted or dispersion compensation operation can be performed by using the greatest common divisor of each amount at the cutoff shifted fiber or the dispersion compensation fiber. At this structure, the optical amplifiers and the CSF/DCFs can be used efficiently, as a result, the number of the optical amplifiers and the CSF/DCFs installed to the optical WDM system can be reduced.

As mentioned above, at the optical WDM system and method of the present invention, inputted one optical wavelength multiplexed signal branches into "n" optical signals. In this, "n" is an integer being two or more. These branching "n" optical wavelength multiplexed signals are inputted to the CSF/DCFs, and the optical wavelength signals of respective requiring optical wavelengths are extracted and outputted. As a result, the optical wavelength dividing operation between one optical wavelength signal outputted by the one optical wavelength divider and the other optical wavelength signals outputted by the other optical wavelength dividers becomes independent with each other. Therefore, the trouble at the one optical wavelength divider does not influence to other optical wavelength signals to be operated for the wavelength division.

While the present invention has been described with reference to the particular illustrative embodiment, it is not to be restricted by this embodiment but only by the appended claims. It is to be appreciated that those skilled in the art can change or modify the embodiment without departing from the scope and spirit of the present invention.

What is claimed is:

1. An optical wavelength division multiplex (WDM) system, comprising:

a first optical coupler in which is inputted one optical wavelength multiplexed signal which branches into "n" optical wavelength multiplexed signals, "n" being an integer being two or more;

at least one more optical coupler to receive at least one of said "an" optical wavelength multiplexed signals for branching "a" optical wavelength multiplexed signals; and "n" optical wavelength divides configured in parallel, to which said branching "n" optical wavelength multiplexed signals are inputted, and in which each of said "n" optical wavelength dividers extracts a required optical wavelength signal from said branching optical wavelength multiplexed signals respectively, and which output the extracted optical wavelength signals, said first optical coupler being connected to said "n" optical wavelength dividers configured in parallel, and each one of said branching "n" optical wavelength multiplexed signals and each one of said "n" optical wavelength dividers is grouped as a pair respectively, an optical wavelength multiplexed signal dividing operation being performed between one optical wavelength signal to be outputted from one optical wavelength divider and other optical wavelength signals to be outputted from the other optical wavelength dividers independent mutually.

2. An optical WDM system in accordance with claim 1, further comprising:

an optical amplifier which amplifies said inputted optical wavelength multiplexed signal; and cutoff shifted fibers (CSFs) which perform cutoff shifted operation or dispersion compensation fibers (DCFs) which perform dispersion compensation operation.

3. An optical WDM system in accordance with claim 1, wherein:

said one optical coupler connects to a plurality of optical wavelength dividers in parallel.

4. An optical wavelength division multiplex (WDM) system, comprising:

an optical amplifier which amplifies an inputted optical wavelength multiplexed signal and outputs the amplified optical wavelength multiplexed signal;

a first optical coupler which is connected to said optical amplifier and to which said amplified optical multiplexed signal outputted from said optical amplifier is inputted, and in which said amplified inputted optical wavelength multiplexed signal branches into "n" optical wavelength multiplexed signals n being an integer two or more;

a first cutoff shifted fiber or dispersion compensation fiber (CSF/DCF) and a second CSF/DCF which are connected in parallel to said first optical coupler, and to which said branching "n" optical wavelength multiplexed signals are inputted by the requirement of the cutoff shifted operation or dispersion compensation operation respectively, and perform the cutoff shifted or dispersion compensation operation for said branching "n" optical wavelength multiplexed signals a second optical coupler which is connected to said first CSF/DCF branch, in which said branching optical wavelength multiplexed signals inputted from said first CSF/DCF branch into said required number of optical wavelength multiplexed signals;

a third optical coupler which is connected to said second CSF/DCF branch, in which said branching optical wavelength multiplexed signals inputted from said second CSF/DCF branch into said required number of optical wavelength multiplexed signals;

the number of optical wavelength multiplexed signals inputted to said second optical coupler excluding one of the CSF/DCFs which are connected in parallel to said first optical coupler;

the number of optical wavelength multiplexed signals inputted to said third optical coupler excluding one of the CSF/DCFs which are connected in parallel to said first optical coupler; and "n" optical wavelength dividers which are connected in parallel to said number of optical wavelength multiplexed signals inputted to said second optical coupler excluding one of the CSF/DCFs and to said number of optical wavelength multiplexed signals inputted to said third optical coupler excluding one of the CSF/DCFs and directly to said second optical coupler and said third optical coupler respectively.

5. An optical WDM method, comprising:

branching into "n" optical wavelength multiplexed signals for inputted one optical wavelength multiplexed signal, "n" being an integer two or more;

dividing said optical wavelength multiplexed signal into "n" respective required optical wavelengths, by inputting in parallel said branching "n" optical wavelength multiplexed signals and extracting each required optical wavelength signal from said optical wavelength multiplexed signals and outputting the "n" extracted optical wavelength signals respectively;

connecting in parallel said branching process to said dividing process, and making each one of said branching "n" optical wavelength multiplexed signals and each one of said "n" optical wavelength dividing processes a pair respectively; and making optical wavelength multiplexed signal dividing process between one optical wavelength signal to be outputted from one optical wavelength dividing process and the other optical wavelength signal to be outputted from the other optical wavelength processes independent mutually.

6. An optical WDM method in accordance with claim 5, further comprising:

amplifying said inputted optical wavelength multiplexed signal; and cutoff shifted processing or dispersion compensation processing for said branching "n" optical wavelength multiplexed signals.

7. An optical WDM method in accordance with claim 5, wherein:

dividing said optical wavelength multiplexed signal into "n" respective required optical wavelengths is a process composed of a cascade connecting, and this cascade connecting includes a distributing parallel connecting.

8. An optical WDM method, comprising:

amplifying an inputted optical wavelength multiplexed signal and outputting the amplified optical wavelength multiplexed signal;

branching into "n" optical wavelength multiplexed signals for said amplified optical wavelength multiplexed signals for said amplified optical wavelength multiplexed signal outputted from said optical amplifying process and outputting said branching "n" optical wavelength multiplexed signals, "n" being an integer two or more;

performing cutoff shifted operation or dispersion compensation operation for said branching "n" optical wavelength multiplexed signals by the requirement of the cutoff shifted operation or dispersion compensation operation respectively, and outputting optical wavelength multiplexed signals operated cutoff shifted or dispersion compensation to respective branching process;

branching into required number of optical wavelength multiplexed signals for optical wavelength multiplexed signals inputted from said cutoff shifted or dispersion compensation processes and outputting optical wavelength multiplexed signals; and dividing "n" optical wavelength multiplexed signals into individual optical wavelength signal and outputting them, in which "n–2" of them are outputted from performing cutoff shifted operation or dispersion compensation operation and two of them are outputted from said branching processes directly.

* * * * *